(12) United States Patent
Moore et al.

(10) Patent No.: US 8,176,169 B2
(45) Date of Patent: May 8, 2012

(54) METHOD FOR NETWORK VISUALIZATION (75) Inventors: Todd Moore, Sterling, VA (US);
Kenneth Buonforte, Washington, DC (US); Brian Girardi, Chantilly, VA (US); Matthew Mannarelli, Washington, PA (US); Scott Moore, Fredericksburg, VA (US)

(73) Assignee: EMC Corporation, Hopkinton, MA (US)

( * ) Notice: Subject to any disclaimer, the term of this patent is extended or adjusted under 35 U.S.C. 154(b) by 801 days.

(21) Appl. No.: 11/851,702

(22) Filed: Sep. 7, 2007

(65) Prior Publication Data

US 2009/0067443 A1 Mar. 12, 2009

(51) Int. Cl.
*G06F 15/173* (2006.01)
*G06F 15/177* (2006.01)

(52) U.S. Cl. ........ 709/224; 709/223; 709/225; 709/226; 370/233; 370/234; 370/241; 370/250

(58) Field of Classification Search .................. 713/201; 709/224; 370/235
See application file for complete search history.

(56) References Cited

U.S. PATENT DOCUMENTS

| | | | | |
|---|---|---|---|---|
| 5,414,809 A * | 5/1995 | Hogan et al. .................. | 715/765 |
| 6,076,106 A * | 6/2000 | Hamner et al. ................ | 709/223 |
| 6,101,493 A * | 8/2000 | Marshall et al. .................. | 1/1 |
| 6,253,199 B1 * | 6/2001 | Wakio et al. ..................... | 1/1 |
| 6,269,447 B1 | 7/2001 | Maloney et al. | |
| 6,539,335 B1 * | 3/2003 | Morris ............................ | 702/179 |
| 6,584,501 B1 * | 6/2003 | Cartsonis et al. ............. | 709/224 |
| 7,047,423 B1 * | 5/2006 | Maloney et al. .................. | 726/2 |
| 2002/0196292 A1 * | 12/2002 | Itoh et al. ....................... | 345/853 |
| 2003/0115333 A1 * | 6/2003 | Cohen et al. .................... | 709/227 |
| 2003/0131098 A1 * | 7/2003 | Huntington et al. ........... | 709/224 |
| 2003/0135612 A1 * | 7/2003 | Huntington et al. ........... | 709/224 |
| 2004/0143658 A1 | 7/2004 | Newton et al. | |
| 2005/0216421 A1 * | 9/2005 | Barry et al. ..................... | 705/64 |
| 2007/0088815 A1 * | 4/2007 | Ma et al. ......................... | 709/224 |
| 2007/0150457 A1 * | 6/2007 | Goldman et al. ................. | 707/3 |
| 2007/0180526 A1 | 8/2007 | Copeland, III | |

* cited by examiner

*Primary Examiner* — Joe Cheng
*Assistant Examiner* — Jason Harley
(74) *Attorney, Agent, or Firm* — Edell, Shapiro & Finnan, LLC (57) ABSTRACT

A method of visualizing network data includes parsing a collection of packets in accordance with a set of categories related to characteristics of the collection of packets, the categories including listings of categorical elements, wherein at least some of the categorical elements are selectable by a user. When a categorical element is selected by a user, the collection of packets is filtered in accordance with the selected categorical element. Alongside each categorical element is a selectable count value that is indicative of the number of discrete communications sessions in which an associated categorical element is present in the collection of packets. When the count value is selected, a session view or views is/are created for each respective session, with content payload available for review and viewing.

19 Claims, 9 Drawing Sheets

METHOD FOR NETWORK VISUALIZATION

FIELD OF THE INVENTION

Embodiments of the present invention relate to data network analysis and, more particularly, to methods of presenting views of network traffic and content.

BACKGROUND OF THE INVENTION

Computers on a network send information to each other as part of a communication session. The data for a communication session is broken up by the network and transferred from a source address to a destination address. This is analogous to the mail postal system, which uses zip codes, addresses, and known routes of travel to ship packages. If one were to ship the entire contents of a home to another location, it would not be cost effective or an efficient use of resources to package everything into one container for shipping. Instead, smaller containers would be used for the transportation and assembled after delivery. Computer networks work in a similar fashion by taking data and packaging it into smaller pieces for transmitting across a network. Each of these packets is governed by a set of rules that defines its structure and the service it provides. For example, the World Wide Web has a standard protocol defined for it, the Hyper Text Transport Protocol (HTTP). This standard protocol dictates how packets are constructed and how data is presented to web servers and how these web servers return data to client web browsers.

Any application that transmits data over a computer network uses one or more protocols. There are many layers of protocols in use between computers on a network. Not only do web browsers have protocols they use to communicate, but the network has underlying protocols as well. The use of multiple nested protocols is sometimes referred to as "data encapsulation." For example, when a request is made to a web site, the data request is encapsulated by the HTTP protocol used by the browser. The data is then encapsulated by the computer's network stack before it is put onto the network. The network may encapsulate the packet into another packet using another protocol for transmission to another network. Each layer of the protocol helps provide routing information to get the packets to their target destination.

In order for a network administrator or other entity to analyze or monitor its users' traffic effectively, tools may be deployed to: "sniff" or capture the packets traversing the network of interest; understand the protocol(s) being used in the communication; analyze the data packets used in the communication; and draw conclusions based on information gained from this analysis. Conventional tools for analyzing network traffic include protocol analyzers, intrusion detection systems, application monitors, log consolidators, and combinations of these tools.

A conventional protocol analyzer can provide insight into the type of protocols being used on a network. The analysis tools within such an analyzer enable the analyzer to decode protocols and examine individual packets. By examining individual packets, conventional protocol analyzers can determine where the packet came from, where it is going, and the data that it is carrying. However, it is virtually impossible to look at every packet on a network by hand to see if security or other concerns exist. Consequently, more specialized analysis products were created.

One example of a more specialized but conventional analysis tool is an Intrusion Detection System (IDS), which validates network packets based on a series of known signatures. If the IDS determines that certain packets are invalid or suspicious, the IDS provides an alert. Analysts, in some cases using additional analysis tools, must then analyze most of these alerts. This analysis can require extensive manpower and resources.

Another example of a more specialized but conventional analysis tool is an application monitor. Application monitors focus on specific application layer protocols to decide if illegal or suspicious activity is being performed. Such conventional application monitors may focus, for example, on the Hyper Text Transfer Protocol (HTTP) to monitor accesses to websites. As such, when a network user visits a website, the analyst can monitor the packets transmitted and received between the network user's computer and the web server. These packets can be analyzed by parsing the HTTP protocol to determine the website's hostname, the name of the file requested, and the associated content that was retrieved. Thus, this HTTP analyzer could be used to decide if a network user is visiting inappropriate web sites and alert appropriate personnel of this activity. This type of analysis tool monitors the actions of web browsers, but falls short for other types of communications.

Another conventional application monitor can monitor the Simple Mail Transport Protocol (SMTP). This system can be used to, e.g., record and track e-mails sent outside of a company to ensure employees were not sending trade secrets or intellectual property owned by the company. It can also ensure e-mails entering into a company do not contain malicious attachments or viruses. Employees could, however, use other means of communication such as instant messaging, chat rooms, and website-based e-mail systems to circumvent detection. Because this application monitor only monitors SMTP communications, companies must also use many other security and analytical tools to monitor network activity.

Another example of a more specialized but conventional analysis tool is a log consolidator system (LCS). An LCS processes log-based output from network applications or devices. These data inputs can include firewall logs, router logs, application logs such as web server or mail server logs, host system logs, and/or IDS alerts. LCS analysis tools aggregate and correlate each different log format. However high level log data often lacks detail needed for effective analysis.

While these and other conventional network analysis systems analyze communications of a particular protocol or format, they fail to analyze a broad breadth of protocols and formats, and provide true context. Thus, an entity wishing to ensure security of its network currently must purchase and maintain multiple network analysis systems. Further, with each new protocol or protocol change, companies must create, rewrite, upgrade, or repurchase at least one of their systems. The conventional method of using a patch-work of multiple analyzers is expensive and complex to maintain.

In addition, because of the many ways to communicate over a network and the many different analysis tools needed to perform deep content and context analysis, the conventional network analysis methods make it difficult to answer even simple questions such as "What is happening on my network?," "Who is talking to whom?," and "What resources are being accessed?" Answering these questions is difficult because there is virtually no limit to which applications one can use. Each application introduced onto a network brings new protocols and new analytical tools to audit those applications. For example, there are many ways to send a file to another person using a network: E-mailing the document as an attachment using the SMTP protocol; transmitting the file using an Instant Messenger like MSN, AOL IM™, or Yahoo™ IM; uploading the file to a shared file server using the FTP protocol; web sharing the document using the HTTP protocol; or uploading the file directly using an intranet protocol like SMB or CIFS. All of these protocols are implemented differently and special analysis tools are required to interpret them—a complex and expensive system.

In sum, the ever-increasing amount and different possible types of network traffic is forcing network administrators, Internet service providers (ISPs), corporate information technology (IT) managers, and law enforcement personnel, among others, to re-evaluate how best to effectively monitor the types and nature of data traffic that traverses the networks for which they have oversight.

One system that provides significant insight into network traffic is described in U.S. patent application Ser. No. 10/133,392, entitled "Apparatus and Method for Network Analysis," and filed Apr. 29, 2002 ("the '392 application"). The methodology described in the '392 application includes capturing network traffic in its native format, and converting the same into a common language, or event-based language. Records of the data can then be organized around the common language. The disclosure of the '392 application is incorporated by reference herein in its entirety.

Notwithstanding the advances and advantages of the systems and methods described in the '392 application, there is nevertheless a need for improved systems and methodologies for monitoring network traffic.

SUMMARY OF THE INVENTION

Embodiments of the present invention provide systems and methods that translate network packet streams into easily interpretable information. The system and methodology may be used for network intrusion analysis, incident response, network investigations, ediscovery, anti-data leakage, threat and malware analysis, and compliance verification.

The system and methodologies provided by embodiments of the invention operate as a collection, transformation, correlation, and analysis solution providing insight into electronic data networks. The embodiments act as a sort of "video camera" on the network, recording all activities (in some embodiments), and transforming data into a dense transactional model describing the network, application, and content levels of those activities. This information enables users to quickly and effectively investigate the model for patterns of concern.

Embodiments of the present invention provide analysis in an intuitive fashion, without complicated "network-speak." The system allows for the analysis of multiple protocols and applications including, for example, email, instant messaging, file transfers, and even Voice-over-IP. With the data presentation techniques provided by embodiments of the present invention, both analysts and business users can easily interpret raw packet data associated with enterprise user transactions.

Features of embodiments of the present invention may allow users to:

Isolate I/T asset misuse and external threats;
Manage insider threats and data leakage;
Speed incident response, security audits and investigations; and
Verify policy and regulatory compliance, among many other benefits.

Embodiments of the present invention may be provided as software or as a network appliance. The invention may be used to collect live network traffic or process pre-collected packets from other collection systems. Features of the invention may also be integrated to augment existing network infrastructure components. For example, triggers from intrusion detection, log consolidators, network behavior and content monitoring systems can be used to guide user inspection of data.

More specifically, an embodiment of the present invention provides a method of visualizing and displaying a representation of data that has traversed a network. The method includes the steps of:

Storing a collection of packets retrieved from an electronic network;

Displaying a list of categories related to characteristics of the collection of packets, the categories including listings of categorical elements, wherein at least some of the categorical elements are selectable by a user;

Receiving an indication that one of the categorical elements has been selected, and filtering the categorical elements in accordance with the selected categorical element; and Displaying a selectable count value adjacent each of the categorical elements, the selectable count value being indicative of the number of times an adjacent categorical element is present in the collection of packets, or byte volume of that categorical element.

The method may also include storing a plurality of collections of packets, and selecting one of the plurality of collections of packets for display.

In a preferred embodiment, the method provides for receiving successive indications that categorical elements have been selected, and successively filtering the categorical elements in accordance with respective ones of the selected categorical elements. In connection with this feature, the method may further display a "breadcrumb" path indicative of the successive selected categorical elements. Preferably, each of the components of the path is selectable by user such that an earlier view of the data can be easily and quickly accessed.

The visualization method may further include displaying a session view of selected packets in the collection of packets, and doing so in response to a receipt of an indication that the selectable count value has been selected. The session view may display a time a given session occurred, a service type of the given session, a size of the session, and a plurality of events associated with the session. The session view preferably further displays pairs of network layer entities such as Internet Protocol (IP) addresses associated with the given session, or application layer entities such as user or filename. An arrow icon is preferably incorporated into the session view to indicate which way a particular communication within a given session is directed. The session may still further include a selectable view content icon, which, when selected, causes a display to show the content of the given session.

In another embodiment, a method of visualizing network data includes:

Presenting to a user, on a display, a plurality of categories that represent characteristics of network data, each category having listed thereunder a series of listings corresponding to respective categories, each listing having associated therewith a count value that indicates the number of times an associated listing is present in the network data, wherein both the listings and respective count values associated therewith are user selectable;

Receiving an indication that one of the listings has been selected, and in response thereto re-presenting to the user, on the display, the plurality of categories but only with respective listings that have been filtered in accordance with the one of the selected listings; and Receiving an indication that one of the count values has been selected, and in response thereto presenting to the user, on the display, a session view of network data associated with the listing with which the selected count view is associated.

These and other features of embodiments of the present invention, and their attendant advantages, will be more fully appreciated upon a reading of the following detailed description in conjunction with the accompanying drawings.

DETAILED DESCRIPTION

Figure 1:
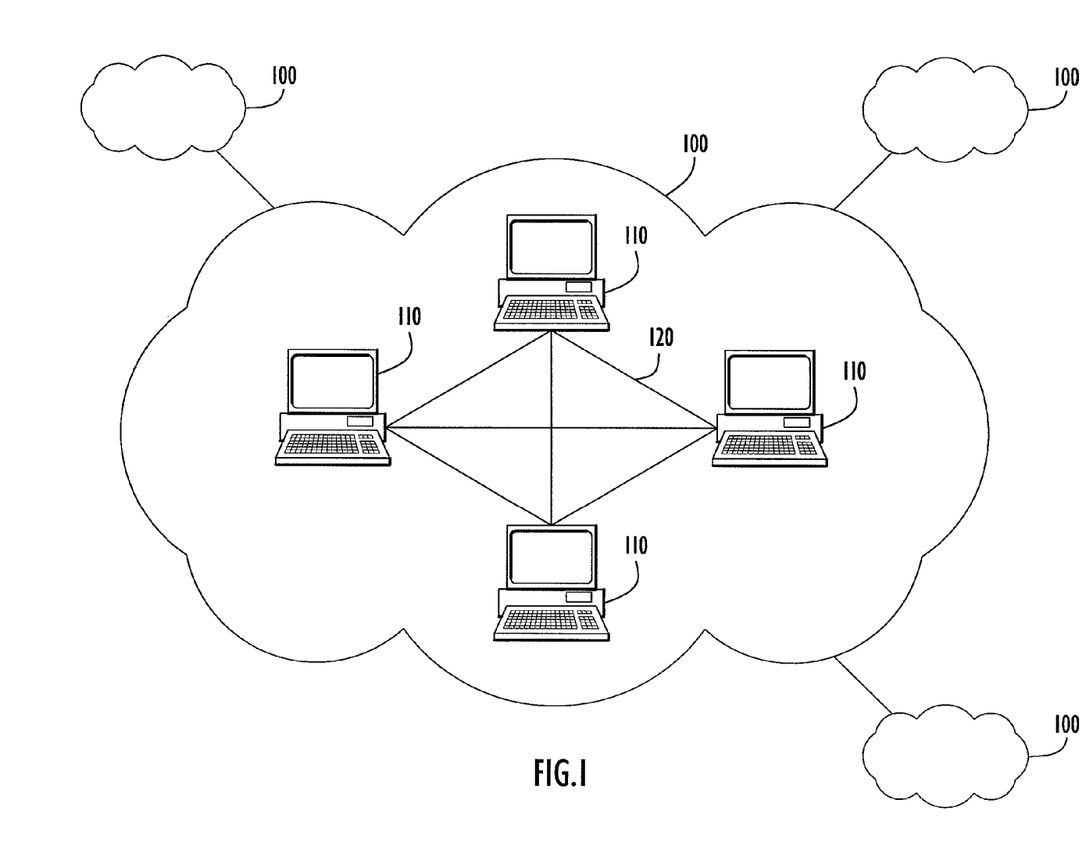
FIG. 1 is a schematic diagram of a network in which embodiments of the present invention may operate.

FIG. 1 depicts a typical network environment in which embodiments of the present invention may operate. A given electronic data network 100 comprises a plurality of computers 110 that are interconnected with one another, often times, via a local area network (LAN) operating in accordance with, e.g., the Ethernet standard. Respective networks 100 can likewise be connected to each other, such that any given computer 110, which is physically connected within a given network 100, can communicate with virtually any other computer 110, which is physically or wireless sly connected within the any other network. Conventionally, digital information flows among networks using the Internet Protocol (IP). Such digital information is broken up into individual packets in accordance with the protocol and addressed with unique IP addresses in order to be passed from one node (such as a computer 110) to another node (such as another computer 110).

According to TeleGeography, a division of PriMetrica, Inc. (Carlsbad, Calif.), as of mid-2005, the volume of data that traversed cross-border internet backbones stood at just under 1 Terabit per second (Tbps). While any single given network does not carry that much traffic, it is not uncommon for Terabytes of data to traverse a sub-network over any given period of days or weeks. Analyzing this amount of data in a meaningful and efficient way is a significant challenge. To address this challenge, the present invention provides a unique set of views into this vast amount of data, including providing intuitive representations of relationships among various data categories and elements.

Figure 2:
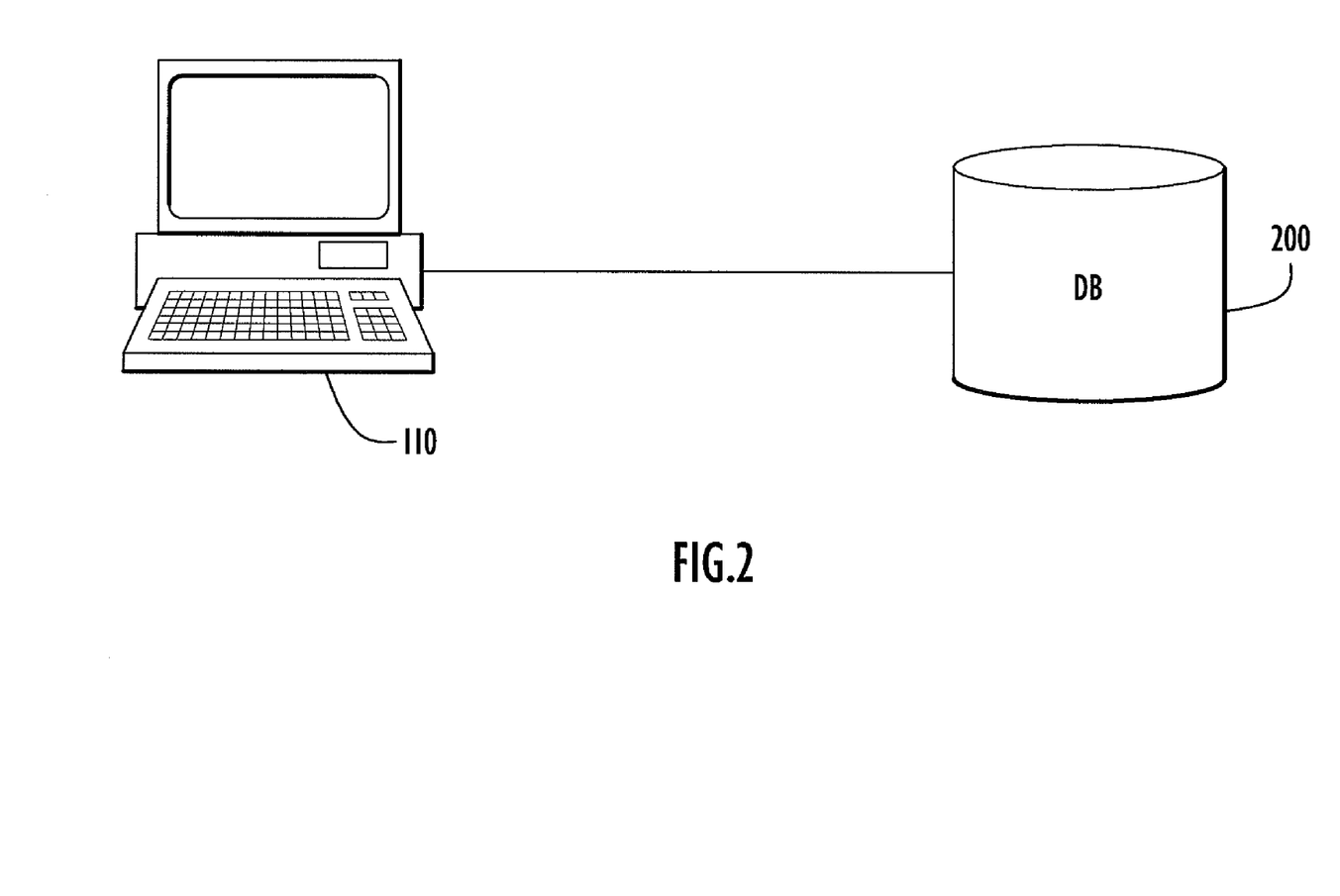
FIG. 2 is a schematic diagram of a data store or database that stores packet collections that are made available for display in several different possible views in accordance with embodiments of the present invention.

FIG. 2 shows a simple representation of a data store or database 200 that is connected to a computer 110 on which executable program code is running, which code provides or generates the network data views described more fully below. In an actual implementation of the invention, the code is written using C++, C# and Java. However, those skilled in the art will appreciate that other software development environments, programming languages, etc., may be used to implement the systems and processes for network data visualization in accordance with the instant invention. For instance, the systems and processes described herein may be web-based and operate via a web browser, or may be client based. Database 200 may be implemented as files, object-oriented databases, SQL databases, or any other suitable database architecture that allows for access to individual data packets that have been captured from network(s) 100.

Data packets can be captured in one of two ways. First, data may be captured in real-time ("Real-Time Network Capture Mode"). In this mode, traffic may be captured from a given network 100 by connecting to a network "wire" using, e.g., the well-known libpcap capture driver, or variants thereof. To capture data, the driver preferably monitors a hub, a port-spanned switch or a passive network tap in the network. In one possible implementation, monitoring may be established between a corporate firewall and the corporate intranet, thereby allowing monitoring of outbound and inbound Internet traffic.

Ideally, if the system is capturing real-time traffic from a network, the point of collection is preferably logically invisible to would-be hackers or other targets. To achieve invisibility, the network card used for collection may be configured to operate without a TCP/IP or other network stack. Without a TCP/IP stack, a network card will neither respond to probes from the network nor broadcast data from the card. However, the card can still collect data transmitted or traversing over the network. Such a configuration may be referred to as a "stealth mode." Of course, where invisibility is not a necessity, the network card may operate in a conventional manner.

A second way to obtain a collection of network traffic is from a third party source that has previously recorded a collection of traffic. For example, TCPDump files, previously collected from a UNIX-based machine, can be loaded and stored in database 200. This mode may be referred to as "Filed Based Network Capture Mode." In either case, Real-Time Network Capture Mode or Filed Based Network Capture Mode, a collection of packets is stored for further processing and user controlled presentation.

Figure 3:
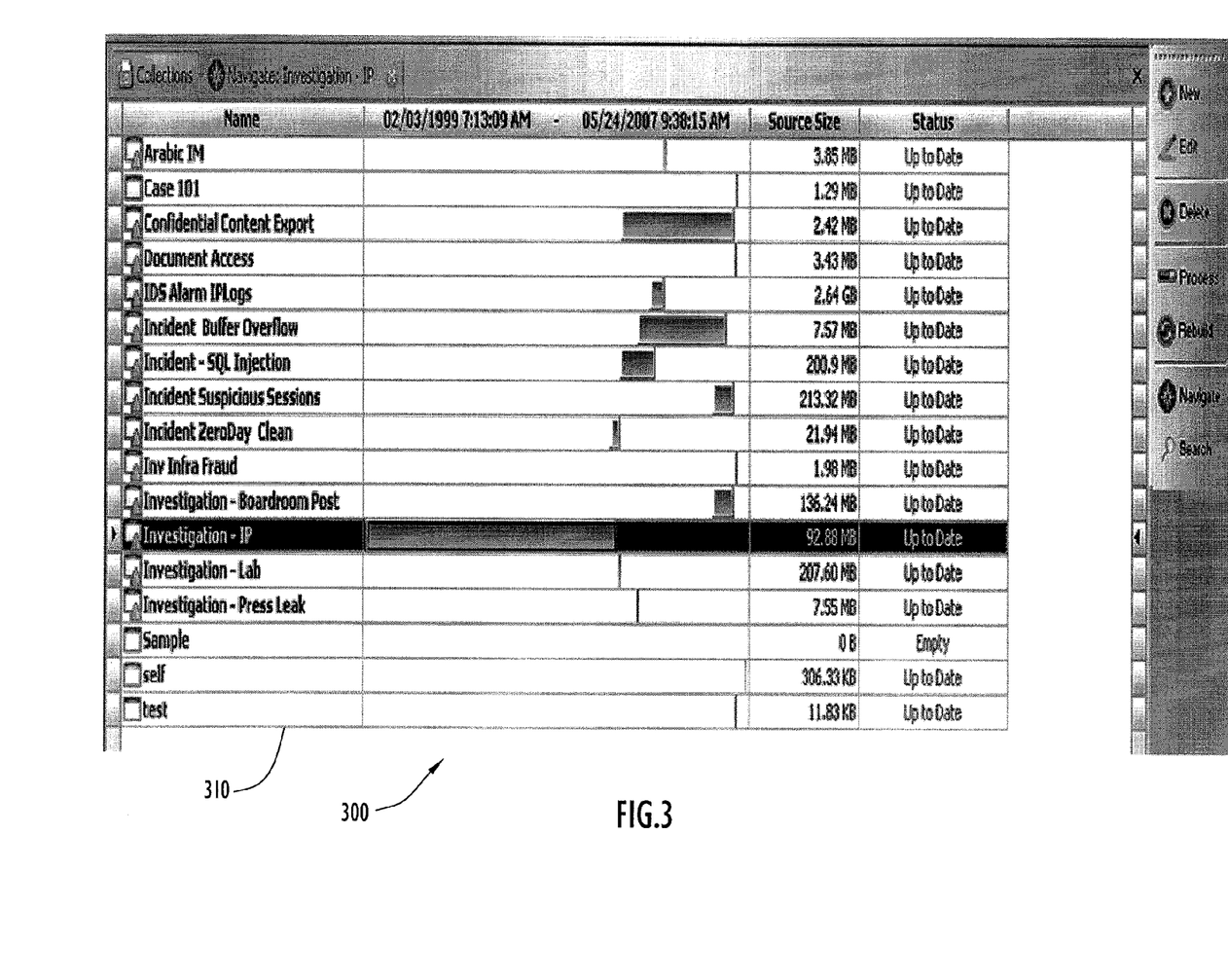
FIG. 3 shows an exemplary packet collection display view in accordance with an embodiment of the present invention.

FIG. 3 shows an exemplary screen shot 300 of a plurality of packet collections 310 that have been respectively named and stored in respective databases 200, or the same database 200. Individual ones of these packet collections 310 may have been collected as described above. It is inconsequential to the instant invention how any given packet collection comes to be stored in a database 200.

Figure 4:
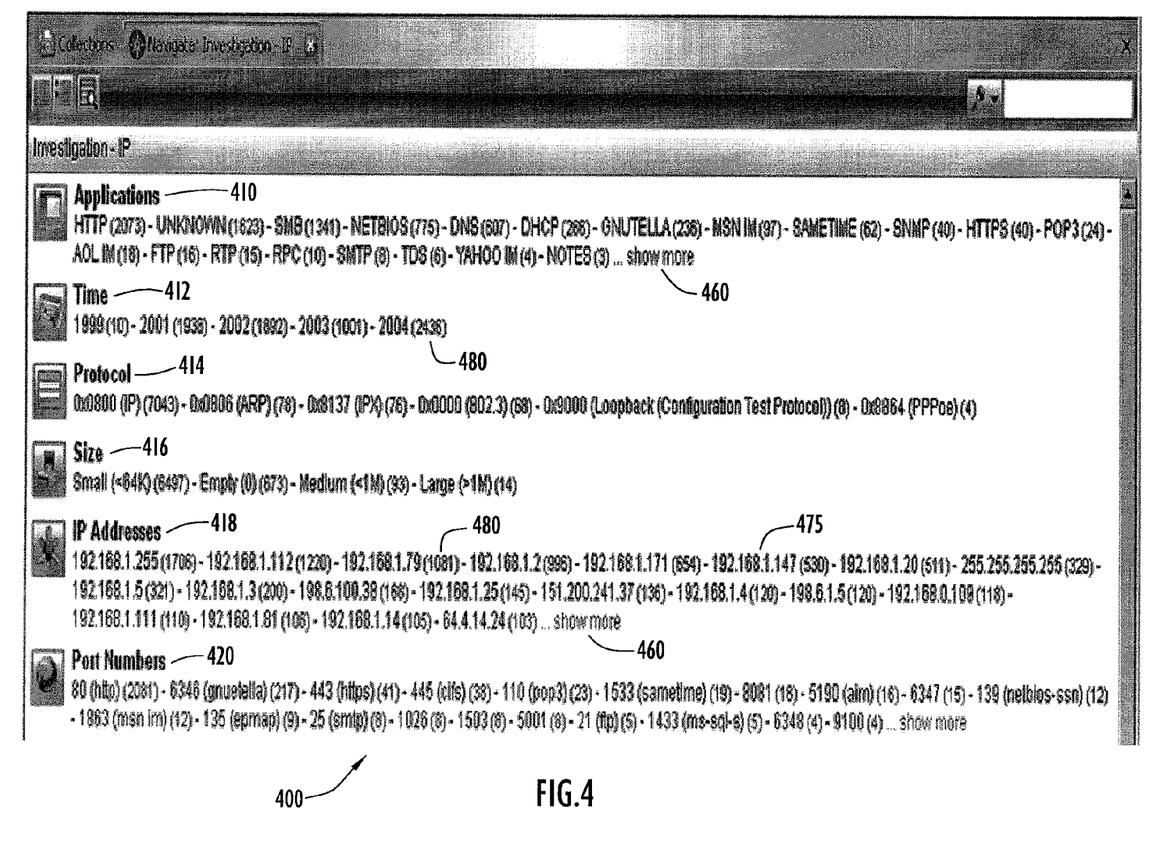
FIGS. 4-6 show exemplary navigation views including successive drill down views in accordance with an embodiment of the present invention.
Figure 5:
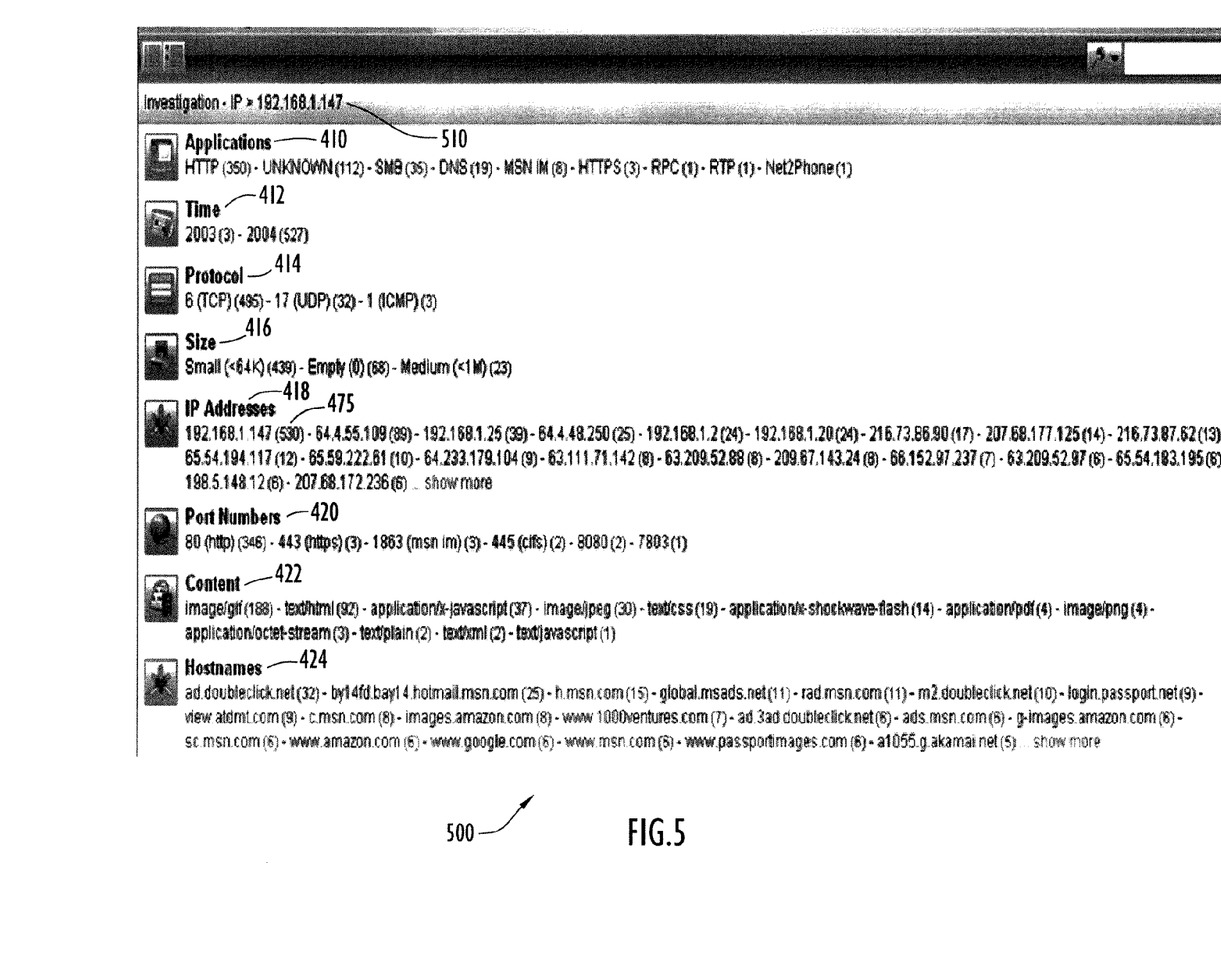

By clicking on a given one of the collections of packets 310—in this case "Investigation IP"—screen 400 of FIG. 4 is preferably displayed. Screen 400 represents a first of a series of displays or screens that allows a user to view ever-increasing details about network data, and in particular, details about the selected packet collection 310. Stated alternatively, using the several screens and views described herein, a user can quickly "drill down" into network data to look for specific details, as desired. As shown, screen 400 (as well as screens 500 and 600 of FIGS. 5, 6A, 6B) includes a plurality of bolded categories that describe the plurality of packets in the selected collection of packets 310. Categories include:

410—Applications—applications verified within the traffic may include, e.g., HTTP, RTP, SNMP, HTTPS, POP3, FTP, GNUTELLA, and SMTP, among others.

412—Time—this category includes a time period such as a given year, month, week, day, hour span, etc. This category helps to identify traffic that occurred at a specific time.

414—Protocol—the protocol category identifies the Ethernet protocol in accordance with which a given session is configured. For example, protocols might include, IP, ARP, IPX, PPPoE, etc.

416—Size—this category represents the total session size.

418—IP Addresses—this category lists the IP addresses associated with the collection of sessions.

420—Port Numbers—this category identifies port numbers associated with the collection of sessions.

422—Content—this category shows what content type given sessions carry as their payloads. For example, as shown in screen 400, content may include text/html, image/gif, image/jpeg, etc.

424—HostNames—this category provides the domain name present in given sessions. For example, for an HTTP session, the domain name for that transaction could be registered as www.samplecorporation.com.

426—Properties—the properties category provides a listing of properties for each session. This list may include the existence of passwords, encryption, querystring, referrer, attachment, and many other descriptors.

428—Action—the action category describes a specific action such as get, login, logoff, put, delete, send, etc.

430—UserNames—this category identifies names of users.

432—Email Addresses—this category includes the email addresses of users.

434—Files—this category describes names of files.

Those skilled in the art will appreciate that other categories of information associated with network traffic may also be included and used to help categorize discrete elements of captured data at the network and application layer. For instance, categories may be broken down into more granular representations to include, e.g., source IP, destination IP, source MAC Address, destination MAC Address, IP Protocol, and many others.

Screen 400 also shows several additional features. For instance, at the end of the listings for several of the categories, there is, preferably, a "clickable link" named "show more" 460. By clicking on this link, more items or listings under the particular category are provided for presentation. In connection with this, elements listed under most of the categories include a parenthetical "count" value 480 that represents how many sessions, packets, or byte count the given element represents in the collection of packets. Further, the elements under each category are arranged in descending count order. However, the view may be configured to display in, e.g., ascending count order. Alternatively, the items under categories may be arranged in alphanumeric order. The user preferably has control over the ordering method used.

Moreover, each element listed in the several categories is also preferably a clickable link. Thus, in order to further drill down into the collection of packet data 310, a user merely needs to click (with a mouse or other pointing device) on, or select, a desired element under a given category. For purposes of discussion, element 475, which corresponds to IP address 192.168.1.147, may be clicked, which causes screen 500 of FIG. 5 to be displayed. Screen 500 includes substantially the same categories as screen 400, but now only data that is associated with IP address 192.168.1.147 is displayed. As shown, that IP address is also now listed first under the IP address category. Thus, by a single click of a mouse (or other known selection method), a user can capture from the collection of packets 310 all network information having to do with the selected IP address. As can be seen, the number of different application types 410 is fewer, as are the elements of the time and protocol categories 412, 414. In other words, by selecting an element from screen 400, the collection of packets is filtered based on the selected element—in this case a selected IP address.

Figure 6A:
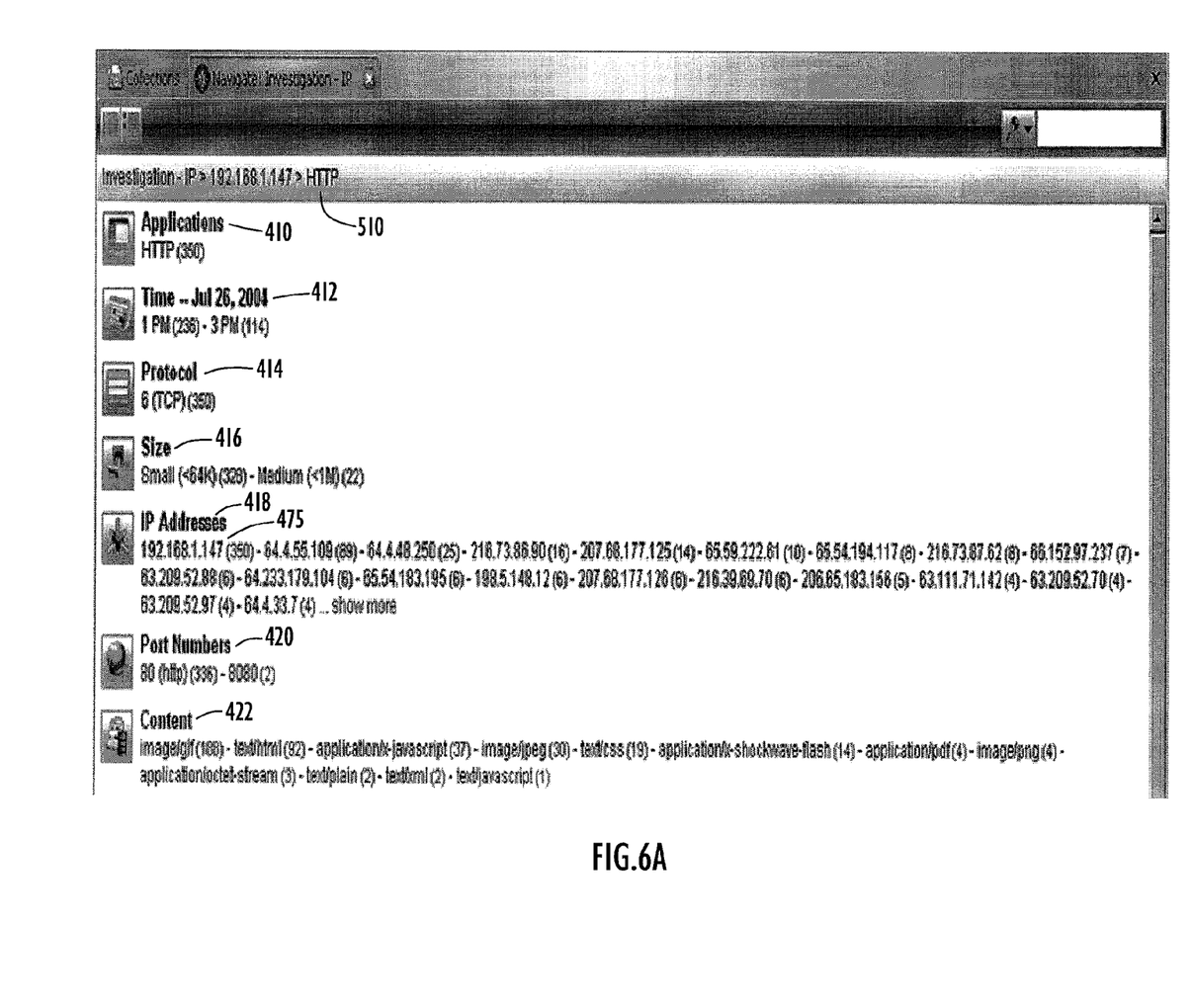
Figure 6B:
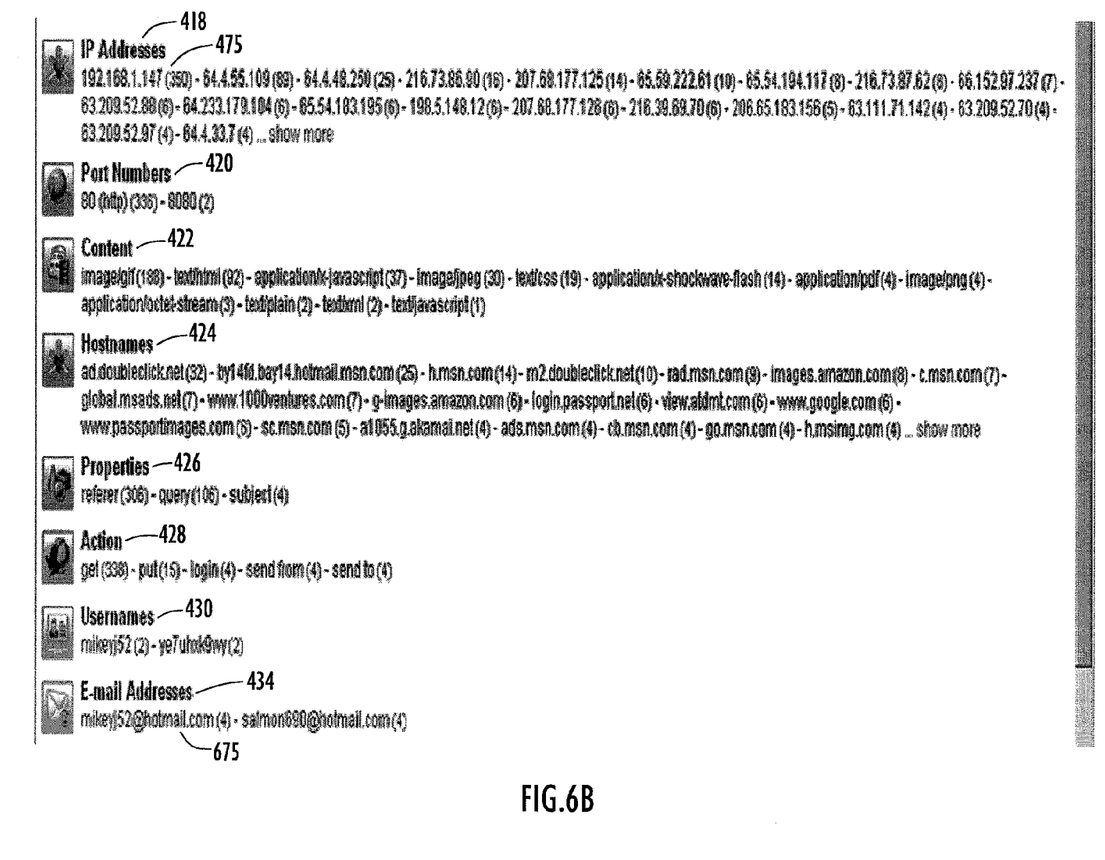
Figure 7:
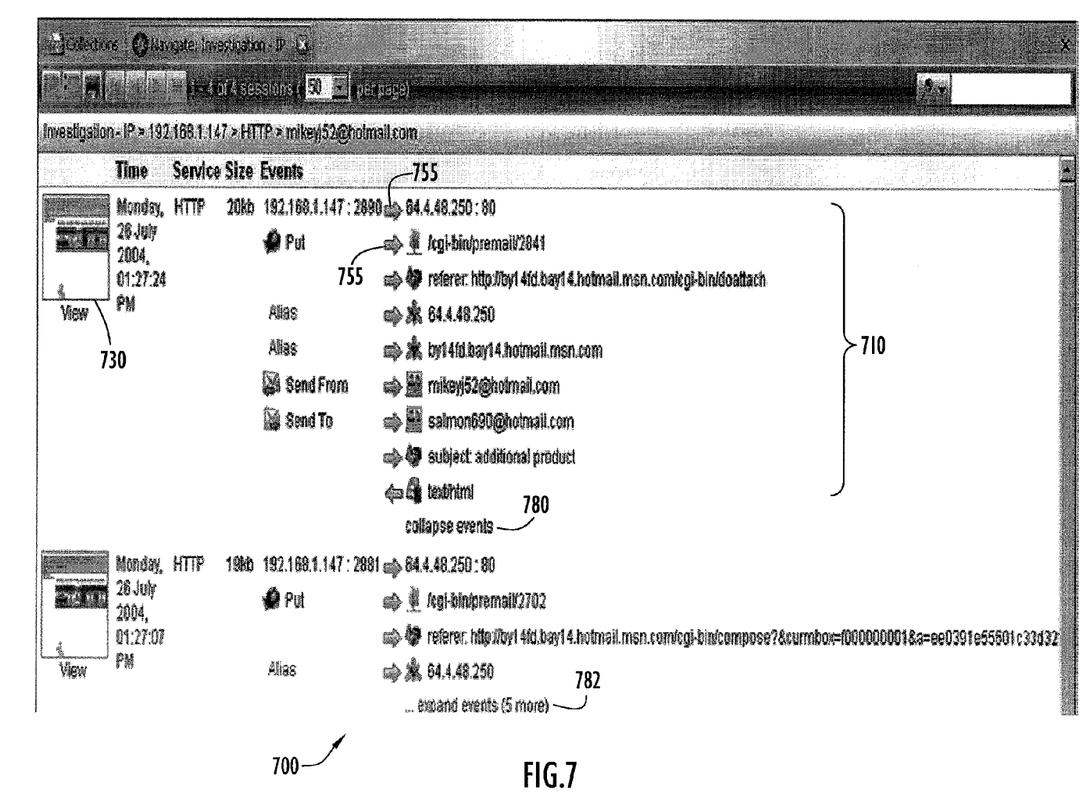
FIG. 7 shows an exemplary event view in accordance with an embodiment of the present invention.

Noteworthy in screen 500 is the beginning of a "breadcrumb" 510 that delineates a drill down or query path. In a preferred embodiment, each element in breadcrumb 510 is a clickable link enabling the user to quickly move back up the path (and display an earlier screen). To still further drill down, a user may, for example, click on element "HTTP" under the applications category 410, thereby further filtering the data to be presented. Screen 600 of FIGS. 6A and 6B shows the result of the further filtering and a further expanded breadcrumb path 510. By then clicking on, e.g., a selected email address (e.g., "mikeyj52@hotmail.com") 675 (FIG. 6B), screen 700 of FIG. 7 is displayed to a user.

Figure 8:
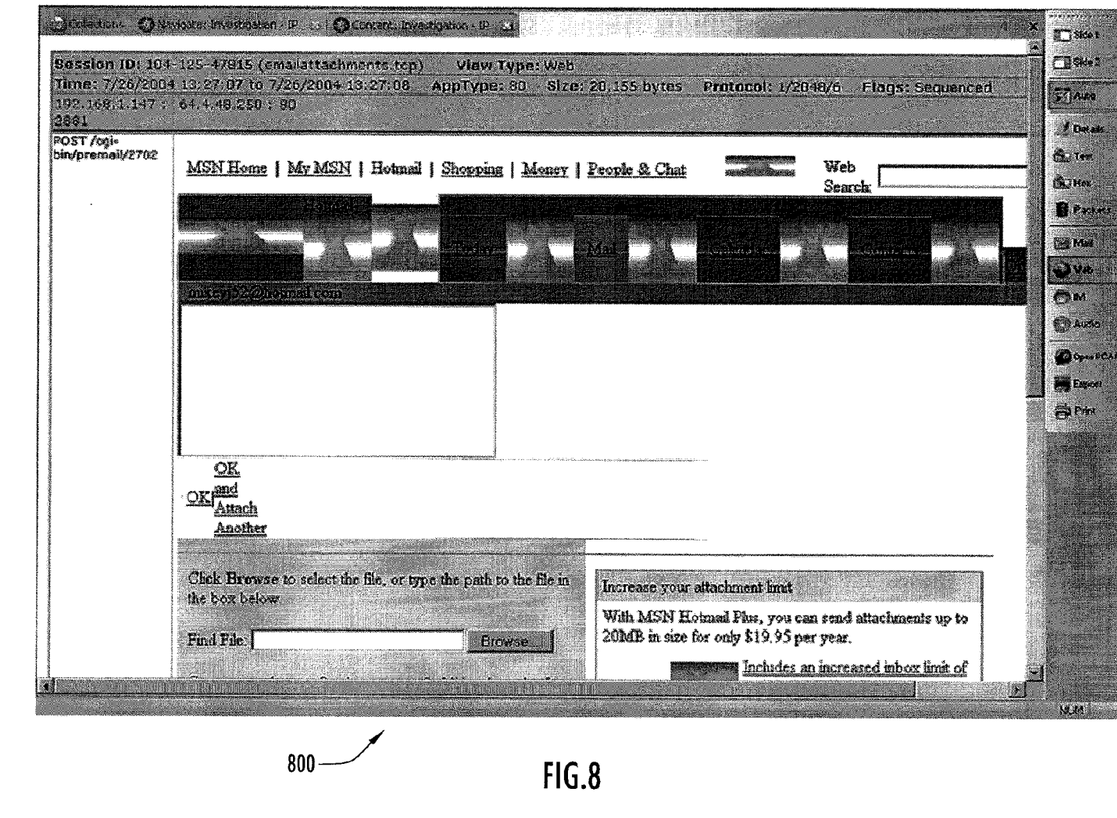
FIG. 8 shows an exemplary content view in accordance with an embodiment of the present invention.

Screen 700 is another unique visual display of network data in accordance with the present invention. This view may be referred to as an "event view" or "session description" in that network data filtered in accordance with an IP address, a selected application (or service), and a particular email account and shown via screens 400, 500 and 600, is now depicted by session. Session 710, for example, is arranged in five general columns: a view select button/icon 730, time, service (or application), size and events. The time, service and size columns correspond to the same categories on screens 400, 500, and 600. By clicking on view button/icon 710, screen 800 of FIG. 8 is displayed to the user. In addition, by hovering a mouse over the shown image, a quick preview of the content screen 800 of FIG. 8 may also be shown. FIG. 8 is described later herein.

The events column of screen 700 is of particular interest. The first line of this column identifies two entities (192.168.1.147 and 64.4.48.250) that are part of the session being "depicted" in this view. Further down the column are several actions such as "put," "send from" and "send to" along with destination or source locations associated with the specific event. Thus, by quickly scanning screen 700, it is possible to obtain a simple view of a session that includes, in this case, IP address 192.168.1.147 and the mickeyj52@hotmail.com email address. Referring back to FIG. 6B, it can be seen that the count associated with element 675 is four. Thus, although not all are shown in screen 700 of FIG. 7, four separate sessions could be viewed by scrolling down on screen 700.

Actions that may be listed under the events column of screen 700 may include, but are not limited to:

login
logoff
sendfrom
sendto
get
put
delete
attach
print

Also shown in screen 700 of FIG. 7 are arrows 755 that designate which way communication between the identified nodes is directed. As shown, most of the communication is directed from IP address 192.168.1.147 to IP address 64.4.48.250. Further, as shown, next to each of the arrows 755, is preferably a description or the nature of the data that is being passed from one node to the other in the session. Thus, for instance, the subject of an email is listed, or the notation "text/html" is listed showing information passing from the node on the right to the node on the left.

Finally, to keep views manageable, clickable elements "collapse events" 780 and "expand events" 782 are provided to enable a user to minimize or maximize the list of events for a given session 710.

If a user desires to view more definitively the actual content of a given session, the user may click on view element 730, which leads to screen 800 of FIG. 8. In this case, a web page is seen as the content. This is consistent with the last listed event in the top session 710 on screen 700—text/html.

From the forgoing it can be appreciated that embodiments of the present invention provide an intuitive and efficient view into network data, and particularly network data that has been stored and is now being analyzed. A user can select a given collection of packet data, and then quickly "drill down" through that data using an intuitive graphical user interface and mouse (or other pointing device). Many of the views allow a user to move back and forth between different types of views, thus enabling a user to quickly find connections between network users, patterns in network use, and obtain insight into general network operations, among other things.

The systems and methods described herein may be embodied in other specific forms without departing from the spirit or essential characteristics thereof. The foregoing embodiments are therefore to be considered in all respects illustrative and not meant to be limiting.

What is claimed is:

1. A method of displaying a representation of data that has traversed a network, comprising:
   storing a collection of packets retrieved from an electronic network;
   displaying, on a display, a list of categories related to characteristics of the collection of packets, the categories including listings of categorical elements, wherein at least some of the categorical elements are selectable by a user;
   receiving an indication, resulting from a pointing device, that one of the categorical elements has been selected, and filtering the categorical elements in accordance with the selected categorical element;
   displaying a selectable count adjacent each of the categorical elements, the selectable count being indicative of a number of sessions, packets or bytes an adjacent categorical element represents in the collection of packets, wherein the filtering causes a decrease in a value of respective selectable counts;
   displaying a session view of selected packets in the collection of packets upon receipt of an indication that the selectable count has been selected; and
   displaying actual content of a given session upon receipt of an indication that a selectable view content icon has been selected, the actual content being obtained from payloads of packets in the collection of packets.

2. The method of claim 1, further comprising storing a plurality of collections of packets, and selecting one of the plurality of collections of packets for display.

3. The method of claim 1, further comprising receiving successive indications that categorical elements have been selected, and successively filtering the categorical elements in accordance with respective ones of the selected categorical elements.

4. The method of claim 3, further comprising displaying a path indicative of the successive selected categorical elements.

5. The method of claim 1, further comprising displaying a time a given session occurred, a service type of the given session, a size of the session, and a plurality of application and network events associated with the session.

6. The method of claim 5, further comprising displaying a pair of Internet Protocol (IP) addresses associated with the given session.

7. The method of claim 1, further comprising displaying an arrow icon between an identification of an event and a participant of the event showing session direction.

8. The method of claim 1, wherein the actual content is hypertext markup language (HTML), and the step of displaying comprises displaying a web page.

9. A method of presenting network data, comprising:
   presenting to a user, on a display, a plurality of categories that represent characteristics of network data, each category having listed thereunder a series of listings corresponding to respective categories, each listing having associated therewith a count value that indicates a number of sessions, packets or bytes an adjacent listing represents, wherein both the listings and respective count values associated therewith are user selectable;
   receiving an indication, resulting from a pointing device, that one of the listings has been selected, and in response thereto re-presenting to the user, on the display, the plurality of categories but only with respective listings that have been filtered in accordance with the one of the selected listings;
   receiving an indication that one of the count values has been selected, and in response thereto presenting to the user, on the display, a session view of network data associated with the listing with which the one of the count values is associated; and
   displaying actual content of a given session upon receipt of an indication that a selectable view content icon, presented within the session view, has been selected, the actual content being obtained from payloads of packets in the network data.

10. The method of claim 9, further comprising displaying a path indicative of successive steps of listings that have been selected.

11. The method of claim 9, further comprising displaying a time a given session occurred, a service type of the given session, a size of the session, and a plurality of application and network events associated with the session.

12. The method of claim 11, further comprising displaying a pair of Internet Protocol (IP) addresses associated with the given session.

13. The method of claim 11, further comprising displaying an arrow icon between an identification of an event and a participant of the event showing session direction.

14. The method of claim 9, wherein the actual content is hypertext markup language (HTML), and the step of displaying comprises displaying a web page.

15. A method of presenting data from a digital packet network, comprising:
   presenting on a display a plurality of previously collected collections of packet data;
   upon selection of one of the collections, presenting on the display a view of the selected collection that includes multiple categories representing packet attributes and a plurality of elements associated with each category;
   reducing the number of elements being displayed by filtering based on a selected one of the elements;
   displaying a count value adjacent each of the elements, the count value representing a number of sessions, packets or bytes an adjacent element represents in the packet data;
   displaying a session view of selected packets upon receipt of an indication that one of the count values has been selected; and displaying actual content of a given session of data from the digital packet network upon receipt of an indication that a selectable view content icon has been selected, the actual content being obtained from payloads of packets in the data from the digital packet network.

16. The method of claim 15, wherein the multiple categories include at least four of: Application, Time, Protocol, Size, IP Address, Port Number, Content, Host Names, Properties, Action, User Names, email Addresses, and Files.

17. The method of claim 15, wherein at least some of the elements and count values are each selectable using a pointing device.

18. The method of claim 15, wherein the displaying steps are performed on a web browser.

19. The method of claim 15, wherein the actual content is hypertext markup language (HTML), and the step of displaying comprises displaying a web page.

* * * * *